United States Patent
Mitsuoka et al.

(10) Patent No.: US 6,876,127 B2
(45) Date of Patent: Apr. 5, 2005

(54) ULTRASONIC TRANSCEIVER AND ULTRASONIC CLEARANCE SONAR USING THE SAME

(75) Inventors: Hideo Mitsuoka, Nishio (JP); Hiroyuki Kani, Okazaki (JP); Yoshihisa Sato, Nagoya (JP); Masakazu Takeichi, Okazaki (JP); Kiyonari Oda, Gamagoori (JP); Hisanaga Matsuoka, Okazaki (JP); Michihiro Matsuura, Aichi-ken (JP)

(73) Assignees: Denso Corporation, Kariya (JP); Nippon Soken, Inc, Nishio (JP)

( * ) Notice: Subject to any disclaimer, the term of this patent is extended or adjusted under 35 U.S.C. 154(b) by 171 days.

(21) Appl. No.: 10/326,114

(22) Filed: Dec. 23, 2002

(65) Prior Publication Data

US 2003/0121331 A1 Jul. 3, 2003

(30) Foreign Application Priority Data

Dec. 27, 2001 (JP) .......................................... 2001-396162
Oct. 25, 2002 (JP) .......................................... 2002-311860

(51) Int. Cl.⁷ .......................... H01L 41/08; H01L 41/04
(52) U.S. Cl. ...................................... 310/324; 310/334
(58) Field of Search ................................. 310/324–327, 310/334–337, 369, 321–322, 342, 345; 73/632, 652; H01L 41/04, 41/08; G01S 15/93, 7/521; G10K 9/22

(56) References Cited

U.S. PATENT DOCUMENTS

| | | | | |
|---|---|---|---|---|
| 4,556,814 A | * | 12/1985 | Ito et al. ...................... | 310/334 |
| 5,446,332 A | * | 8/1995 | Rapps et al. .................. | 310/324 |
| 5,457,352 A | * | 10/1995 | Muller et al. ................ | 310/327 |
| 6,250,162 B1 | * | 6/2001 | Amaike et al. ............. | 310/334 |
| 2001/0010169 A1 | | 8/2001 | Watarai | |

FOREIGN PATENT DOCUMENTS

| JP | 1-190098 | * | 7/1989 | ........... H04R/17/00 |
|---|---|---|---|---|
| JP | 9-284896 | | 10/1997 | |
| JP | 2001-16694 | | 1/2001 | |
| JP | 2001-078296 | * | 3/2001 | ........... H04R/17/00 |
| JP | 2002-209294 | | 7/2002 | |

* cited by examiner

*Primary Examiner*—Darren Schuberg
*Assistant Examiner*—Karen Beth Addison
(74) *Attorney, Agent, or Firm*—Posz & Bethards, PLC (57) ABSTRACT

In an ultrasonic transceiver, an inner housing has a bottom portion, a first tubular side wall extending from one end surface of the bottom portion and a first flange portion formed on an outer peripheral portion of the first tubular side wall. The bottom portion and first tubular side wall provide a tubular cavity formed therebetween, and the piezoelectric member is mounted on the one end surface of the bottom portion in the tubular cavity. An outer housing has a second tubular side wall coaxially arranged around the outer peripheral portion of the first tubular side wall with a predetermined gap therebetween. The second tubular side wall is provided with one end portion which is opposite to one end surface of the first flange portion and contacted thereto. A first absorption member is inserted in the gap between the first tubular side wall and the second tubular side wall.

15 Claims, 8 Drawing Sheets

ULTRASONIC TRANSCEIVER AND ULTRASONIC CLEARANCE SONAR USING THE SAME

BACKGROUND OF THE INVENTION

1. Field of the Invention

The present invention relates to an ultrasonic transceiver which is installed to, for example, a vehicle such as an automobile or the like and adapted to detect that the vehicle is near to obstacles when the vehicle is parked or turned, and an ultrasonic clearance sonar using the ultrasonic transceiver.

2. Description of the Related Art

An ultrasonic clearance sonar can announce an alert to draw driver's attention to obstacles around the vehicle in accordance with each distance between the vehicle and each obstacle.

The ultrasonic clearance sonar has an ultrasonic transceiver also called to as "microphone" and is configured to cause the transceiver to transmit ultrasonic waves to a space around the vehicle, and measure each distance from the vehicle (ultrasonic transceiver) to each obstacle on the basis of each time for which each echo, that is, each ultrasonic wave reflected from each obstacle is returned to the ultrasonic transceiver. The ultrasonic clearance sonar announces an alert when at least one of the measured distances is reached to a predetermined value.

One conventional method of detecting a trouble occurring in the ultrasonic transceiver, such as disconnection therein or the like, uses the decay time of the reverberation waveform, that is, the waveform obtained after the transmission of the ultrasonic wave, one conventional method which is disclosed in the Japanese Patent Publication No. 2002-209294.

The conventional method of detecting the trouble of the ultrasonic transceiver by using the reverberation waveform cannot accurately judge that the ultrasonic transceiver is abnormal because of the oscillation of the waveform.

Namely, the reverberation is caused by an inertia oscillation of the ultrasonic transceiver, and the inertia oscillation is composed of an oscillation of an ultrasonic transmitting surface of the ultrasonic transceiver and that of a cylindrical tubular side wall, which are synthesized with each other.

The oscillation of the tubular side wall of the synthesized oscillations causes the inaccurate judgment of the ultrasonic clearance sonar. This reason is described hereinafter.

That is, the conventional ultrasonic transceiver comprises a housing having a plate-like bottom portion and a tubular side wall extending therefrom so that the bottom portion and the tubular side wall provide a cavity therebetween. The conventional ultrasonic transceiver also has a piezoelectric element mounted on an inner side of the bottom portion, and a rubber member as an oscillation absorption member with which an outer peripheral portion of the tubular side wall is covered.

Therefore, with the ultrasonic transceiver disposed to a bumper of a vehicle, foreign particles such as wax particles and so on are easily adhered on the outer peripheral portion of the tubular side wall. The adhered particles have an affect on the oscillation of the oscillation absorption member of the tubular side wall, and cause the reverberation waveform to be unstable, making it impossible to accurately judge that the ultrasonic transceiver is abnormal.

Therefore, there is a need for preventing foreign particles, such as wax particles from being adhered on an oscillation absorption member so as to inhibit a change of the oscillation of a tubular side wall of the ultrasonic transceiver, and to allow an ultrasonic clearance sonar to accurately judge that the ultrasonic transceiver is abnormal on the basis of the reverberation waveform.

SUMMARY OF THE INVENTION

The present invention is made on the background of the need of the related art.

That is, it is an object of the present invention to provide an ultrasonic transceiver and an ultrasonic clearance sonar using it, which are capable of preventing foreign particles such as wax particles or the like from being adhered on an oscillation absorption member of the ultrasonic transducer.

According to one aspect of the present invention, there is provided an ultrasonic transceiver comprising: a piezoelectric member; an inner housing having a bottom portion, a first tubular side wall extending from one end surface of the bottom portion and a first flange portion formed on an outer peripheral portion of the first tubular side wall, the bottom portion and first tubular side wall providing a tubular cavity therebetween, the piezoelectric member being mounted on the one end surface of the bottom portion in the tubular cavity; an outer housing having a second tubular side wall coaxially arranged around the outer peripheral portion of the first tubular side wall with a predetermined gap therebetween, the second tubular side wall being provided with one end portion which is opposite to one end surface of the first flange portion and contacted thereto; and a first absorption member inserted in the gap between the first tubular side wall and the second tubular side wall.

According to another aspect of the present invention, there is provided an ultrasonic transceiver comprising: a piezoelectric member; an inner housing having a bottom portion, a first tubular side wall extending from one end surface of the bottom portion and a first flange portion formed on an outer peripheral portion of the first tubular side wall, the bottom portion and first tubular side wall providing a tubular cavity therebetween, the piezoelectric member being mounted on the one end surface of the bottom portion in the tubular cavity; an outer housing having a second tubular side wall and a second flange portion coaxially extending in its radial direction from a predetermined position of an outer peripheral portion of the second tubular side wall, the second tubular side wall being coaxially arranged around the outer peripheral portion of the first tubular side wall with a predetermined gap therebetween and being provided with one end portion which is opposite to one end surface of the first flange portion and contacted thereto, the predetermined position being away from other end surface of the transmitting wall in the axial direction by a predetermined length; and a first absorption member inserted in the gap between the first tubular side wall and the second tubular side wall.

According to further aspect of the present invention, there is provided an ultrasonic clearance sonar comprising: an ultrasonic transceiver according to claim 1; a switching unit configured to switch the ultrasonic transceiver to allow the ultrasonic transceiver to transmit an ultrasonic wave or to allow the ultrasonic transceiver to receive an ultrasonic wave; means for controlling the switching unit to switch the ultrasonic transceiver to transmit an ultrasonic wave and for controlling the switching unit to switch the ultrasonic transceiver to receive the ultrasonic wave reflected from an object therearound; means for measuring a distance between the object and the ultrasonic transceiver according to a time from transmitting the ultrasonic wave by the ultrasonic transceiver to receiving the reflected ultrasonic wave from the object thereby so as to detect a distance between the ultrasonic transceiver and the object; and means for announcing a warning in a case where the measured distance is not more than a predetermined value.

According to still further aspect of the present invention, there is provided an ultrasonic clearance sonar comprising: an ultrasonic transceiver according to claim 11; a switching unit configured to switch the ultrasonic transceiver to allow the ultrasonic transceiver to transmit an ultrasonic wave or to allow the ultrasonic transceiver to receive an ultrasonic wave; means for controlling the switching unit to switch the ultrasonic transceiver to transmit an ultrasonic wave and for controlling the switching unit to switch the ultrasonic transceiver to receive the ultrasonic wave reflected from an object therearound; means for measuring a distance between the object and the ultrasonic transceiver according to a time from transmitting the ultrasonic wave by the ultrasonic transceiver to receiving the reflected ultrasonic wave from the object thereby so as to detect a distance between the ultrasonic transceiver and the object; and means for announcing a warning in a case where the measured distance is not more than a predetermined value.

BRIEF DESCRIPTION OF THE DRAWINGS

Other objects and aspects of the present invention will become apparent from the following description of embodiments with reference to the accompanying drawings in which.

DETAILED DESCRIPTION OF EMBODIMENTS (First Embodiment)

A first embodiment of the present invention will be described hereinafter with reference to the accompanying drawings.

Figure 1A:
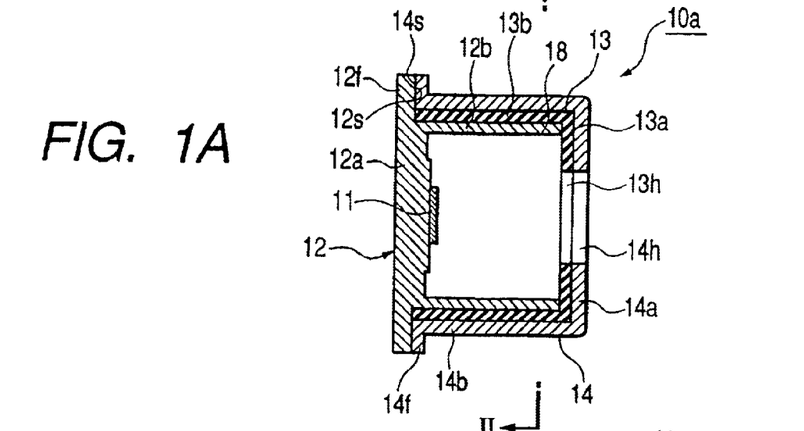
FIG. 1A is a longitudinal cross sectional view of an ultrasonic transceiver in an axial direction thereof according to a first embodiment of the present invention, a state of which, before providing therefor a sponge and a resin layer described hereinafter, is shown.
Figure 1B:
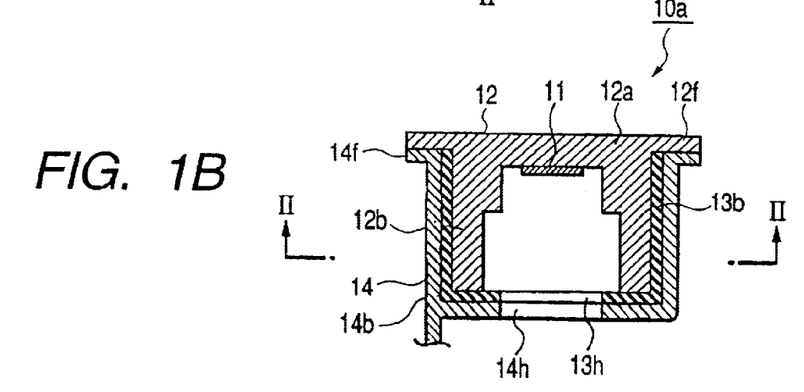
FIG. 1B is a lateral cross sectional view of the ultrasonic transceiver in the radial direction thereof shown in FIG. 1 according to the first embodiment, a state of which, before providing therefor a sponge and a resin layer described hereinafter, is shown.

FIG. 1A is a longitudinal cross sectional view of an ultrasonic transceiver in the axial direction thereof according to the first embodiment, and FIG. 1B is a lateral cross sectional view of the ultrasonic transceiver in the radial direction thereof.

In each of FIGS. 1A and 1B, a state of the ultrasonic transceiver, before providing therefor a sponge and a resin layer described hereinafter, is shown.

Figure 2:
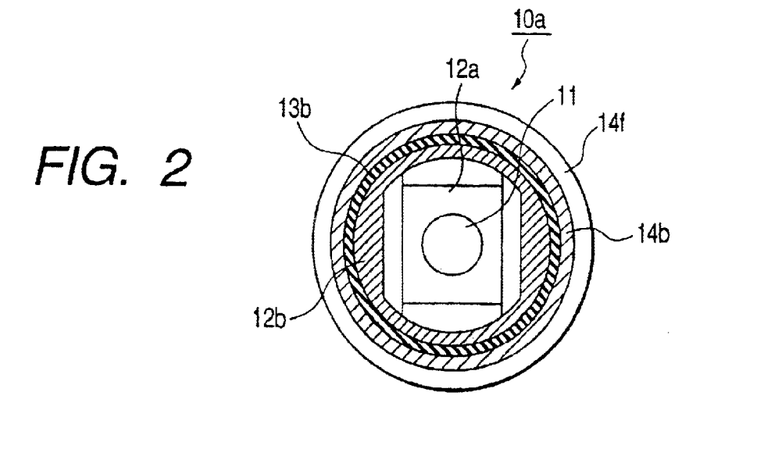
FIG. 2 is a cross sectional view of the ultrasonic transceiver taken on line II—II of each of FIGS. 1A and 1B.

In addition, FIG. 2 is a cross sectional view of the ultrasonic transceiver taken on line II—II of each of FIGS. 1A and 1B.

Figure 3A:
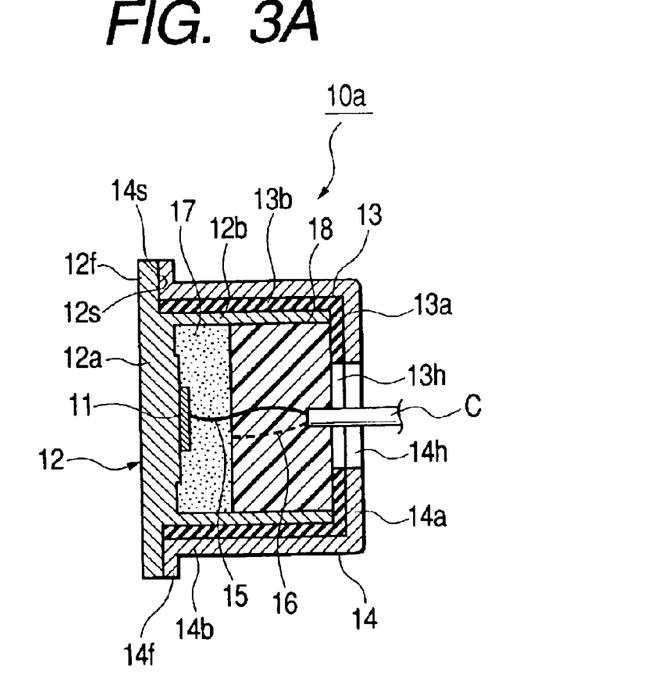
FIG. 3A is a longitudinal cross sectional view of the ultrasonic transceiver in the axial direction thereof according to the first embodiment, for which the sponge and the resin layer are already provided.
Figure 3B:
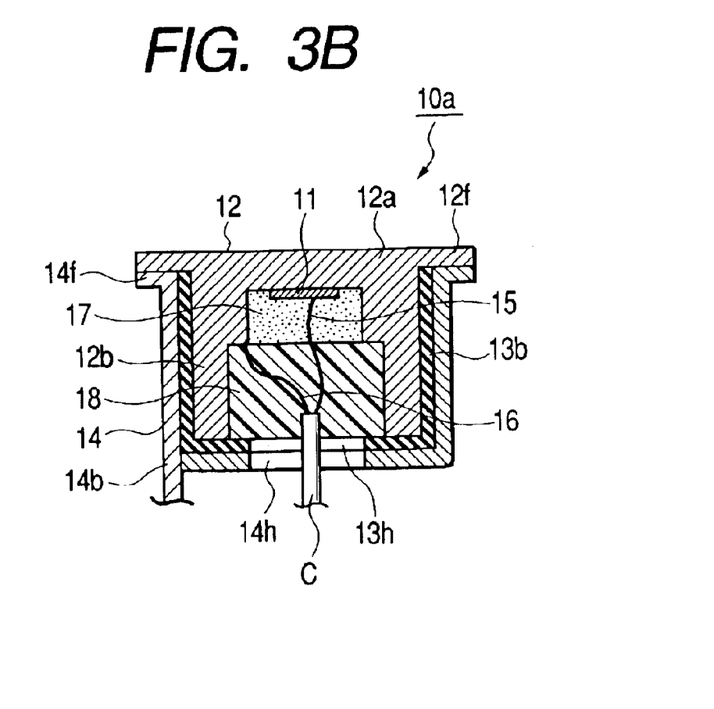
FIG. 3B is a lateral cross sectional view of the ultrasonic transceiver shown in FIG. 3A in the radial direction thereof according to the first embodiment, for which the sponge and the resin layer are already provided.

FIG. 3A is a longitudinal cross sectional view of the ultrasonic transceiver in the axial direction thereof, for which the sponge and the resin layer are already provided, and FIG. 3B is a lateral cross sectional view of the ultrasonic transceiver shown in FIG. 3A in the radial direction thereof.

As shown in each of FIGS. 1A, 1B, 2, 3A and 3B, the ultrasonic transceiver 10a comprises a piezoelectric member 11 constituted by piezoelectric ceramic. The ultrasonic transceiver 10a also comprises an inner housing 12 composed of, for example, aluminum. The inner housing 12 is provided with a cylindrical plate-like bottom portion 12a served as an ultrasonic wave transmitting wall (hereinafter, referred to also simply as "transmitting wall") and a first cylindrical tubular side wall 12b extending from an inner surface of a peripheral portion of the transmitting wall 12a in the axial direction, providing a cylindrical tubular cavity between the transmitting wall 12a and the first tubular side wall 12b.

The piezoelectric member 11 is provided with one and other end surfaces and the one surface of which is mounted on the inner end surface of the transmitting wall 12a so as to be secured thereon.

The inner housing 12 is also provided with a first flange portion 12f extending from the peripheral portion of the transmitting wall 12a in the radial direction and projecting outwardly from the first tubular side wall 12b. That is, the first flange portion 12f is integratedly formed on the transmitting wall 12a and the first tubular side wall 12b.

The ultrasonic transceiver 10a is provided with an oscillation absorption member 13 composed of, for example, rubber or other similar material. The oscillation absorption member 13 has a bottom portion 13a formed at its axial portion with a cylindrical opening 13h, and the bottom portion 13a fills an opening end portion of the inner housing 12 which is opposite to the transmitting wall 12a thereof.

The oscillation absorption member 13 also has a cylindrical tubular side portion 13b with a predetermined width. The tubular side portion 13b extends coaxially from a peripheral portion of the bottom portion 13a toward the transmitting wall 12a of the inner housing 12 so as to fixedly contact to the first flange portion 12f and to cover the outer peripheral portion of the first tubular side wall 12b.

The ultrasonic transceiver 10a also comprises an outer housing 14. The outer housing 14 has a bottom wall 14a formed at its axial portion with a cylindrical opening 14h so that the bottom wall 14a is so mounted on an inner end surface of the bottom portion 13a as to be coaxially arranged thereto.

The outer housing 14 also has a second cylindrical tubular side wall 14b coaxially extending from a peripheral portion of the bottom wall 14a toward the transmitting wall 12a of the inner housing 12 so as to fixedly contact to the first flange portion 12f thereof.

The second tubular side wall 14b is coaxially arranged around the first tubular side wall 12b with a tubular gap therebetween so that the tubular side portion 13b of the oscillation absorption member 13 is inserted in the tubular gap so as to cover the outer peripheral portion of the tubular side portion 13b.

The outer housing 14 is also provided with a second flange portion 14f extending outwardly in the radial direction from the contacted end portion of the outer peripheral portion of the second side wall 14b. An outer end surface 14s of the second flange portion 14f extending from the outer end surface of the transmitting wall 12a is opposite to an inner end surface 12s of the first flange portion 12f so as to be contacted and closely adhered on the inner end surface 12s of the first flange portion 12f.

In addition, as shown in FIGS. 3A and 3B, a balanced type cable (symmetrical cable) C with a pair of lead wires 15 and 16 is inserted through the first and second openings 13h and 14h, and one of the lead wires 15 and 16 is electrically connected to the other end surface of the piezoelectric member 11, other end surface which is not mounted on the inner housing 12. Other of the lead wires 15 and 16 is electrically connected to the inner housing 12.

The ultrasonic transceiver 10a is provided with a sponge 17 for absorbing ultrasonic waves. The sponge 17 is inserted in the tubular cavity of the inner housing 12 and mounted on the inner end surface of the transmitting wall 12a. The ultrasonic transceiver 10a is also provided with a resin layer 18 loaded in the tubular cavity of the inner housing 12 and mounted on the sponge 17. The resin layer 18 is composed of, for example, silicon or the like, and designed to seal the tubular cavity of the inner housing 12.

The ultrasonic transceiver 10a is operative to be supplied through the lead wires 15 and 16 to a high-frequency voltage for allowing the piezoelectric member 11 to resonate, causing the resonated piezoelectric member 11 to transmit ultrasonic waves from the transmitting wall 12a. The ultrasonic transceiver 10a is also operative to receive the echos (the reflected ultrasonic transceiver waves) with the transmitting wall 12a so as to cause the piezoelectric member 11 to oscillate, thereby detecting the voltage caused by the oscillation of the piezoelectric member 11.

One of the features of the ultrasonic transceiver 10a according to the first embodiment is in that the inner end surface 12s of the first flange portion 12f of the inner housing 12 is closely adhered on the outer end surface 14s of the second flange portion 14f of the outer housing 14 so that the structure of the inner and outer housings 12 and 14 allows the oscillation absorption member 13 to be completely covered and concealed from the outside thereof.

The first flange portion 12f may be closely adhered on the second flange portion 14f with an adhesive. In addition, the first flange portion 12f may be screwed to the second flange portion 14f so as to be closely adhered thereon. That is, any manners for closely adhering the first flange portion 12f and the second flange portion 14f may be used.

Figure 4:
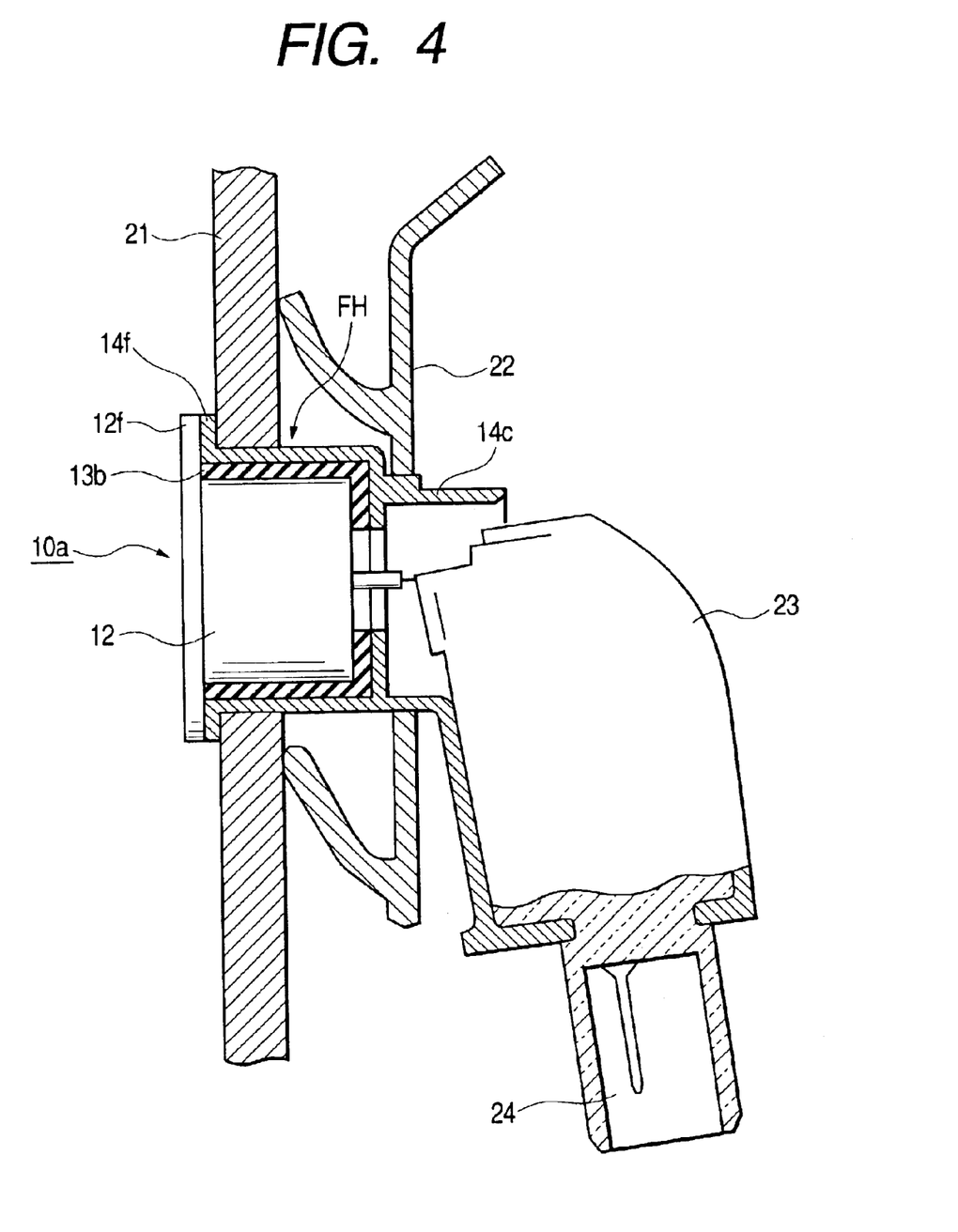
FIG. 4 is a cross sectional view showing a state that the ultrasonic transceiver 10a shown in each of FIGS. 1A, 1B, 2, 3A and 3B is installed on a vehicle.

FIG. 4 is a cross sectional view showing a state that the ultrasonic transceiver 10a shown in each of FIGS. 1A, 1B, 2, 3A and 3B is installed on a vehicle.

That is, the second tubular side wall 14b of the outer housing 14 of the ultrasonic transceiver 10a is inserted from the second bottom side into a fitting hole FH provided in a bumper 21 of the vehicle so as to be penetrated through the fitting hole FH and fitted therein. An inner end surface of the second flange portion 14f which is opposite to the outer end surface 14s thereof is closely contacted to a front surface (an outer surface as a fitting surface) of the bumper 21 so that the first and second flange portions 12f and 14f are exposed in the front-side (outside) of the bumper 21. The second bottom wall side of the outer housing 14 is fixedly secured with a fixing member 22 on the bumper 21.

In this structure shown in FIG. 4, as the fixing member 22, an elastic member or other similar members may be used. A component installation portion 23 is integratedly incorporated to a tubular portion 14c extending toward a back side of the bumper (toward the vehicle' side) from the bottom wall 14a, component installation portion 23 in which electrical components are installed. From the component installation portion 23, a connection terminal 24 is pulled out and connected to an annunciation unit described hereinafter.

The ultrasonic transceiver 10a the structure of which is shown in FIGS. 1A, 1B, 2, 3A and 3B is installed to the bumper 21 of the vehicle so that, as shown in FIG. 4, only the first and second flange portions 12f and 14f are exposed in the outside of the bumper 21, making it possible to prevent any foreign particles, such as wax particles from being adhered on the oscillation absorption member 13, thereby suppressing changes of the oscillations of the first and second tubular side walls 12b and 14b of the ultrasonic transceiver 10a.

Then, this point in that the structure of the ultrasonic transceiver 10a allows the reverberation waveform to be stable is more explained hereinafter.

An adhered particle on an oscillation absorption member of an ultrasonic transceiver usually causes the oscillation of a side wall thereof to last more than that of an ultrasonic wave transmission wall of the ultrasonic transceiver. In this case, the difference between the oscillation of the side wall and that of the ultrasonic wave transmission wall makes change the synthesized state between the oscillation of the side wall and that of the ultrasonic wave transmission wall, causing the reverberation time to be shortened.

The short of the reverberation time sometimes makes an clearance sonar misjudge that a trouble, such as disconnection or the like occurs in the ultrasonic transceiver although any troubles do not occur therein, clearance sonar which uses the ultrasonic transceiver.

Then, in the ultrasonic transceiver 10a according to the first embodiment, the second housing 14 is provided outside of the oscillation absorption member 13 and the inner end surface 12s of the first flange portion 12f of the inner housing 12 is closely adhered on the outer end surface 14s of the second flange portion 14f of the outer housing 14 so that the oscillation absorption member 13 is completely concealed from the outside thereof, preventing any foreign particles, such as wax particles from being invaded into the side portion of the oscillation absorption member 13, making it possible to securely prevent the misjudgment due to the entrance of the foreign particles.

Incidentally, an annular oscillation absorption member may be inserted between the front surface of the bumper 21 and the inner end surface of the second flange portion 14f to be closely contacted to the front surface of the bumper 21 and the inner end surface thereof.

Figure 5:
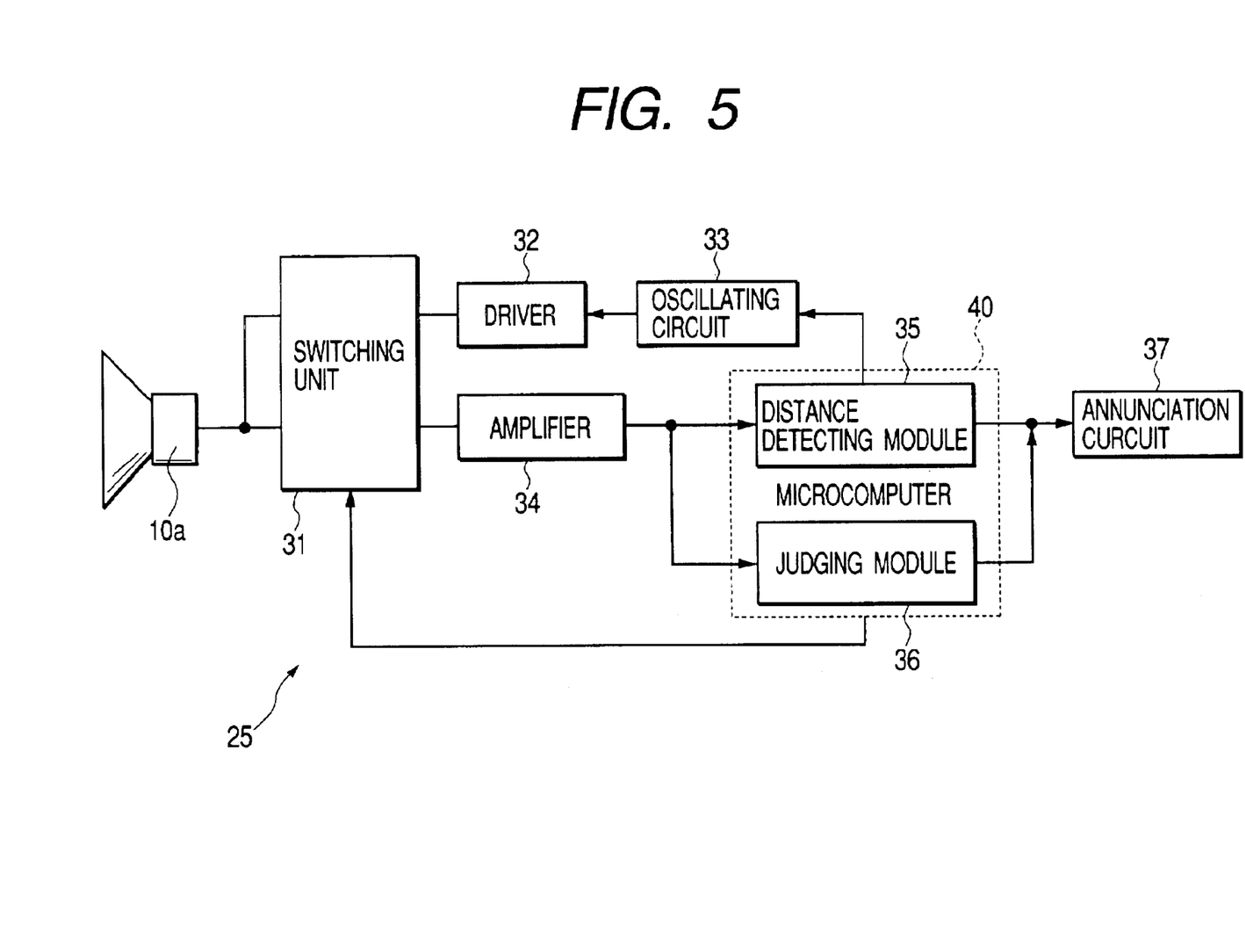
FIG. 5 is a block diagram showing an electrical system of an ultrasonic clearance sonar in which the ultrasonic transceiver shown in FIGS. 1A, 1B, 2, 3A and 3B is installed according to the first embodiment.

FIG. 5 is a block diagram showing an electrical system of an ultrasonic clearance sonar in which the ultrasonic transceiver 10a shown in FIGS. 1A, 1B, 2, 3A and 3B is installed.

The clearance sonar 25 comprises the ultrasonic transceiver 10a and a switching unit 31 electrically connected thereto and configured to switch the ultrasonic transceiver 10a to allow the ultrasonic transceiver 10a to transmit ultrasonic waves or to receive ultrasonic waves.

The clearance sonar 25 also comprises a driver 32 configured to transmit the drive signal (high-voltage signal) through the switching unit 31 to the ultrasonic transceiver 10a, an oscillating circuit 33 electrically connected to the driver 32 and an amplifier 34 electrically connected to the switching unit 31 for amplifying the received signal outputted from the switching circuit 31.

The clearance sonar 25 comprises a microcomputer 40 to which an input terminal of the oscillating circuit 33 and output terminals of the amplifier 34 are electrically connected.

The microcomputer 40 is electrically connected to the switching unit 31 and has a function for switchably controlling the switching unit 31 so as to transmit the drive signal or to receive the ultrasonic waves.

The microcomputer 40 also has a function for sending a command to the oscillating circuit 33 so as to cause the oscillating circuit 33 to oscillate.

The microcomputer 40 furthermore includes a distance detecting module (function module) 35 for detecting each distance between the ultrasonic transceiver 10a and each obstacle around the ultrasonic transceiver 10a on the basis of the signals inputted from the amplifier 34, and a trouble/abnormality judging module (function module) 36 for judging whether or not a trouble/an abnormality occurs in the ultrasonic transceiver 10a. The distance detecting module 35 and the trouble/abnormality judging module 36, which is referred to simply as "judging module 36" hereinafter, of the microcomputer 40 are operatively connected through, for example, the connection terminal 23 to an annunciation unit 37 for annunciating a warning on the basis of the control of the microcomputer 40.

The above electrical components except for the annunciation unit 37 of the ultrasonic clearance sonar 25 are, for example, installed in the component installation portion 23.

Next, operations of the ultrasonic clearance sonar 25 shown in FIG. 5 will be explained hereinafter.

At first, the microcomputer 40 outputs to the switching unit 31 a command for switching the switching unit 31 so as to execute the transmitting operation, and supplies an operation command to the oscillating circuit 33 so as to operate it. The oscillating circuit 33 operates according to the operation command, generating an electric signal such as a high-frequency voltage signal of, for example, 40 kHz. The driver 32 and the switching unit 31 apply the electric signal to the ultrasonic transceiver 10a to drive it, causing the ultrasonic transceiver 10a to transmit ultrasonic waves.

Next, the microcomputer 40 sends to the switching unit 31 a control signal for switching the switching unit 31 so as to execute the receiving operation, causing the ultrasonic transceiver 10a to receive the echos, that is, the transmitted ultrasonic waves reflected from obstacles around the vehicle so that the electric signals corresponding to the echos are supplied through the switching unit 31 to the amplifier 34 to be amplified therewith. The amplified signals are inputted to the microcomputer 40.

The distance detecting module 35 of the microcomputer 40 measures each time $\Delta t$ from transmitting each ultrasonic wave by the ultrasonic transceiver 10a to receiving each echo corresponding to each transmitted wave thereby, detecting each distance between the ultrasonic transceiver 10a and each obstacle.

The distance detecting module 35 of the microcomputer 40, when one of the detected distances is reached to the predetermined value previously stored on the microcomputer 40, that is, one of the detected distances is not more than the predetermined value, sends a command to the annunciation unit 37 to cause the annunciation unit 37 to announce an alert. The judging module 36 of the microcomputer 40 judges whether or not a trouble and/or an abnormality occurs in the ultrasonic transceiver 10a itself according to the output signals from the amplifier 34, sending a command to the annunciation unit 37 to cause it to announce an alert in cases where the judging module 36 judges that a trouble and/or an abnormality occurs in the ultrasonic transceiver 10a.

Figure 6:
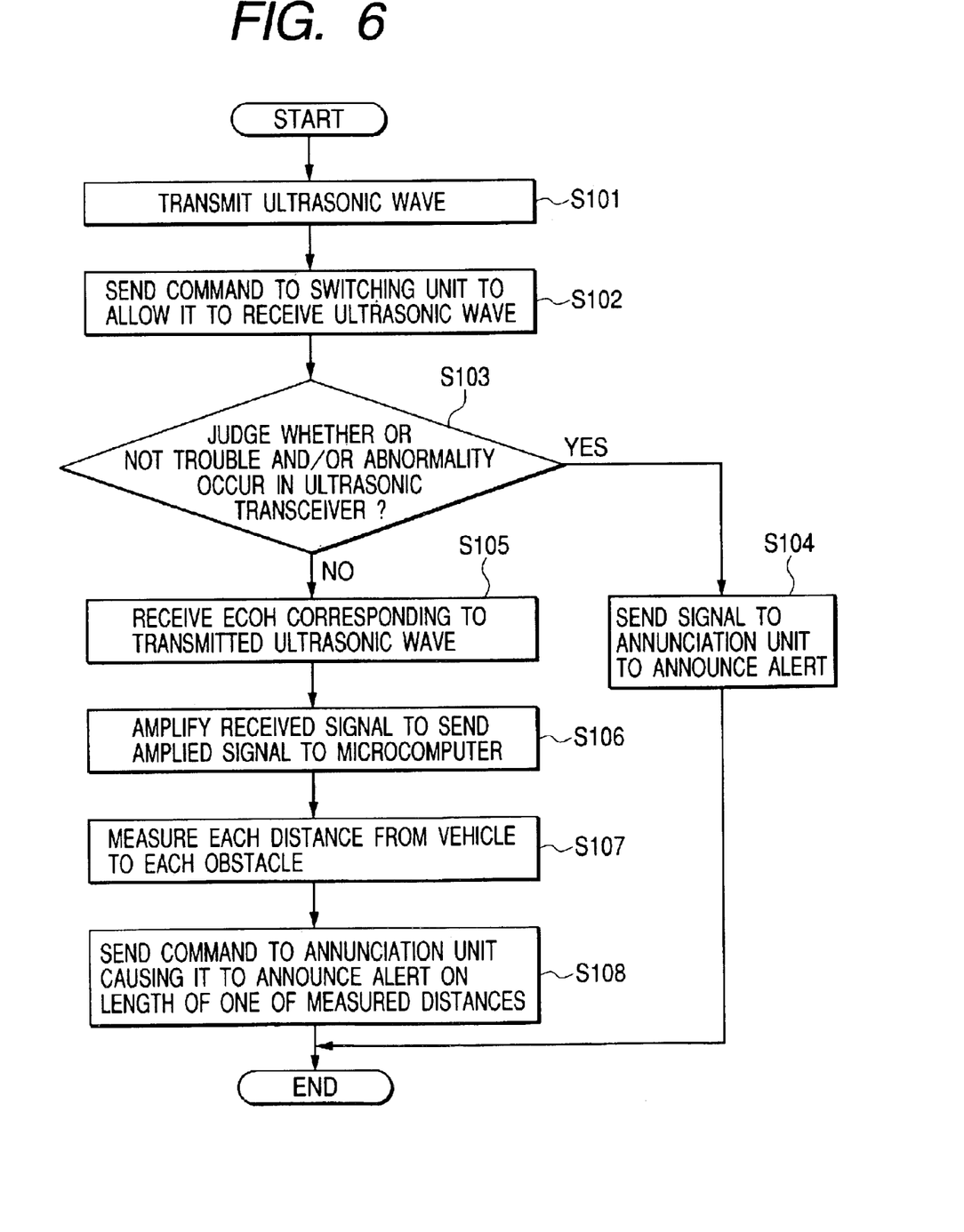
FIG. 6 is a flowchart showing a concrete procedure of the ultrasonic clearance sonar according to the first embodiment.

FIG. 6 is a flowchart showing a concrete procedure of the ultrasonic clearance sonar 25. Especially, the operations of the microcomputer 40 will be described hereinafter in accordance with FIG. 6.

That is, in step 101, the microcomputer 40 makes operate the switching unit 31, the driver 32 and the oscillating circuit 33, causing the ultrasonic transceiver 10a to transmit the ultrasonic waves in the air around the vehicle. Next, in step 102, the microcomputer 40 sends a command to the switching unit 31 to switch the switching unit 31 so as to allow it to receive ultrasonic waves. In step 103, the microcomputer 40, as a process of the distance detecting module 35, judges whether or not a trouble and/or an abnormality occurs in the ultrasonic transceiver 10a according to the reverberation waveform caused by the inertia oscillation of the ultrasonic transceiver 10a.

When at least one of trouble and abnormality occurs in the ultrasonic transceiver 10a, in the step 103, the microcomputer 40 judges YES so that, in step 104, the microcomputer 40 sends a signal indicating that at least one of the trouble and abnormality occurs therein to the annunciation unit 37, causing it to announce an alert.

On the other hand, in cases where no trouble and/or abnormality occurs in the ultrasonic transceiver 10a, in the step 103, the microcomputer 40 judges NO so that, in step 105, the switching unit 31 receives the echos reflected from the obstacles around the vehicle, and the amplifier 34 amplifies the received signals outputted from the switching unit 31 to send the amplified signals to the microcomputer 40. in step 106.

The microcomputer 40, as a process of the distance detecting module 35, measures each distance from the vehicle to each obstacle around the vehicle on the basis of the sent amplified signals.

When at least one of the measured distances is reached to the predetermined value, the microcomputer sends a command to the annunciation unit 37, causing it to announce an alert according to the length of the one of the measured distances, in step 108.

Because the ultrasonic clearance sonar 25 executing the above procedure is installed in the vehicle, when the vehicle is parked or turned, it is possible to detect that the vehicle is near to at least one of the obstacles.

In particular, using the ultrasonic transceiver according to the first embodiment can provide the ultrasonic clearance sonar 25 which allows a change of the oscillation of the tubular side walls of the ultrasonic transceiver 10a to be suppressed, and making it possible to accurately judge whether or not a trouble and/or an abnormality occurs in the ultrasonic transceiver 10a according to the reverberation time.

Incidentally, in the first embodiment, the first flange portion 12f is provided for the inner housing 12, and the second flange portion 14f is provided for the outer housing 14f so that the inner surface 12s of the first flange portion 12f of the inner housing 12 is closely adhered on the outer surface 14s of the second flange portion 14f of the outer housing 14, but the present invention is not limited to the structure.

That is, the one end portion of the second side wall 14b may be closely adhered on the first flange portion 12f of the inner housing 12 without providing the second flange portion 14f for the second housing 14, allowing the percentage of invading foreign particles inside the inner housing 12 to be considerably reduced, making it possible to obtain the effects related to the first embodiment.

In addition, in the first embodiment, the second flange portion 14f is closely adhered on the first flange portion 12f of the inner housing 12, but the present invention is not limited to the structure.

That is, the outer housing 14 may be contacted to the first flange portion 12f of the inner housing 12 so as to allow the invading of foreign particles inside the housing to be restrained.

(Second Embodiment)

Figure 7:
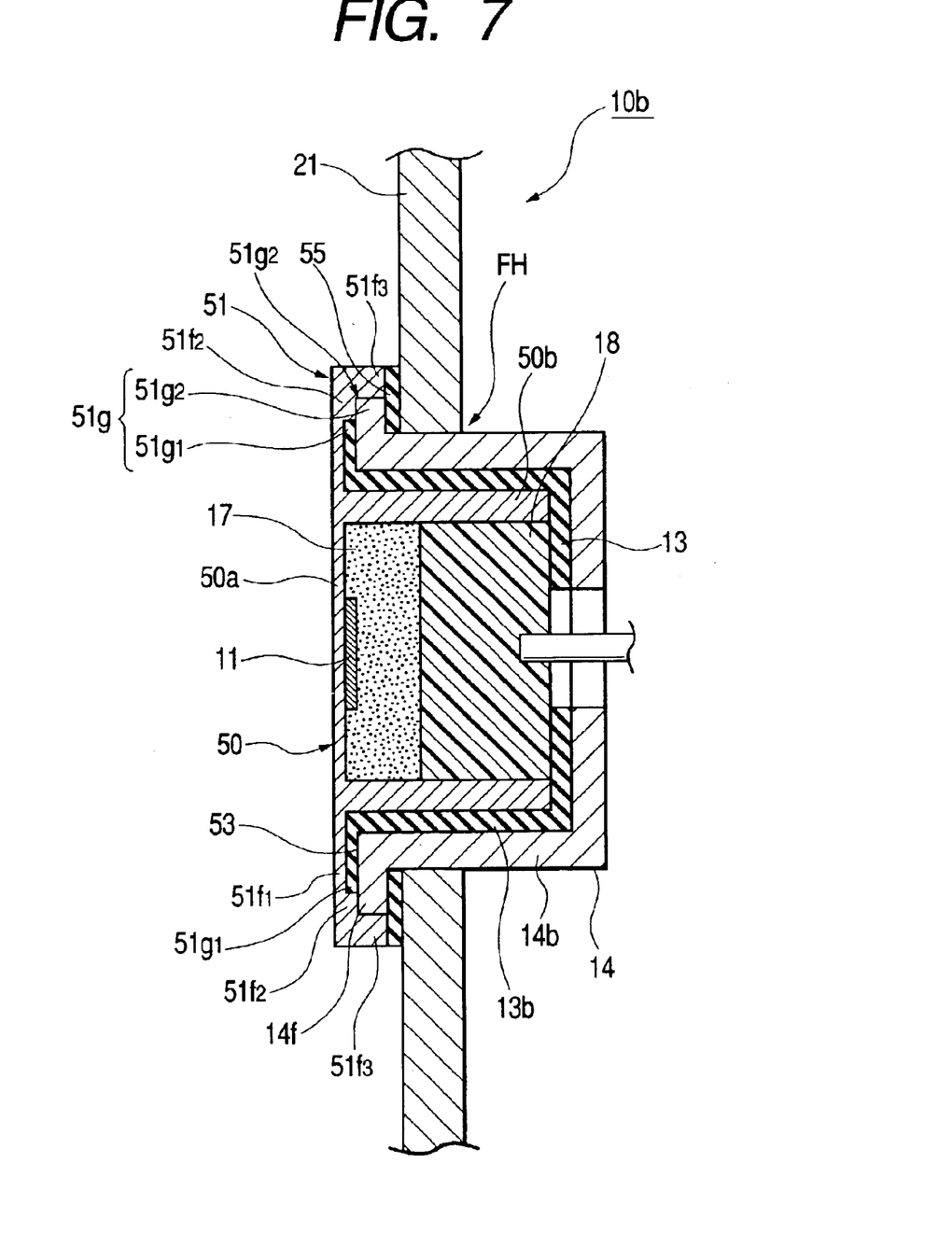
FIG. 7 is a longitudinal cross sectional view showing a state that an ultrasonic transceiver according to a second embodiment of the present invention is installed on a vehicle.

FIG. 7 is a longitudinal cross sectional view showing a state that an ultrasonic transceiver 10b according to a second embodiment is installed on a vehicle.

In FIG. 7, elements of the ultrasonic transceiver 10b which are the same as those of the ultrasonic transceiver 10a are assigned to the same reference numerals thereof, omitting explanations of the elements of the ultrasonic transceiver 10b.

The ultrasonic transceiver 10b according to the second embodiment has an inner housing 50. The inner housing 50 is provided with a cylindrical plate-like bottom portion (transmitting wall) 50a on its inner end surface of which the piezoelectric member 11 is mounted. The inner housing 50 is also provided with a first cylindrical tubular side wall 50b extending from the inner end surface of the peripheral portion of the transmitting wall 50a in the axial direction.

The inner housing 50 is further provided with a first flange portion 51 formed with an annular double-stepped portion. That is the first flange portion 51 is formed with an annular portion 51f1 extending from the peripheral portion of the transmitting wall 50a in the radial direction and projecting outwardly from the first tubular side wall 50b. The first flange portion 51 is also formed with a first stepped portion 51f2 projecting from a middle portion of the annular portion 51f1 in its axial direction at a predetermined first length, and a second stepped portion 51f3 projecting from an outer peripheral portion of the annular portion 51f1 in its axial direction at a predetermined second length.

The first stepped portion 51f2 and the second stepped portion 51f3 are integrated so that the second projecting length is larger than the first projecting length, providing an annular double stepped groove 51g which is composed of a first annular groove 51g1 formed among the annular portion 51f1, the first stepped portion 51f2 and the first tubular side wall 50b, and a second annular portion 51g2 formed among the first stepped portion 51f2, the second stepped portion 51f3 and the second side wall 50b.

The second tubular side wall 14b of the outer housing 14 is coaxially arranged around the first tubular side wall 50b with a tubular gap therebetween so that the tubular side portion 13b of the oscillation absorption member 13 is inserted in the tubular gap so as to cover the outer peripheral portion of the tubular side portion 13b.

The second flange portion 14f of the outer housing 14 is fitted in the second annular groove 51g2 so that the second stepped portion 51f3 of the inner housing 50 covers an outer side periphery of the second flange portion 14, and that an outer end surface of the second flange portion 14f is contacted to an inner end surface of the first stepped portion 51f2. An inner end surface of the second flange portion 14f and an inner end surface of the second stepped portion 51f3 are substantially located in one plane.

In addition, the ultrasonic transceiver 10b is also provided with an oscillation absorption layer 53 inserted to be fitted in the first annular groove 51g1 so that the oscillation absorption layer 53 is formed to be integrated with the oscillation absorption member 13.

The ultrasonic transceiver 10b is provided with an annular oscillation absorption member 55 with thin thickness.

That is, when the ultrasonic transceiver 10b is installed to the bumper 21 of the vehicle, the second tubular side wall 14b of the outer housing 14 of the ultrasonic transceiver 10a is inserted from the second bottom side into the fitting hole FH of the bumper 21 so as to be penetrated through the fitting hole FH and fitted therein.

Then, as shown in FIG. 7, the annular oscillation absorption member 55 is inserted between the front surface of the bumper 21 and each of the inner end surfaces of the second flange portion 14f and the second stepped portion 51f3 of the first flange portion 51 to be closely contacted to the front surface of the bumper 21 and each of the inner end surfaces so that the first flange portion 51 is exposed in the outside (front-side) of the bumper 21, allowing the oscillation absorption member 13, the oscillation absorption layer 53 and the second flange portion 14f to be completely concealed from the outside thereof.

Operations and effects of the ultrasonic transceiver 10b according to the second embodiment, which are structurally different from the first embodiment, will now be described hereinafter.

In cases where the first flange portion 51 is integratedly formed on the first tubular side wall 50b of the inner housing 50 so as to project outwardly in its radial direction, rigidity of the transmitting wall 50a may be made high, causing the sound pressure of the transmitted ultrasonic waves to be decreased, and the first tubular side wall 50b to be unnecessarily oscillated. The unnecessary oscillation of the first tubular side wall 50b may cause the reverberation time to be changed.

However, in the second embodiment, the annular double-stepped groove 51g is formed around the tubular side wall 50b, allowing the rigidity of the transmitting wall 50a to be reduced, making it possible to prevent the sound pressure of the transmitted ultrasonic waves from being reduced, and the reverberation time from being changed.

In addition, because the second flange portion 14f is fitted in the second annular groove 51g2 so that the outer periphery of the second flange portion 14f is covered with the second stepped portion 51f3 of the inner housing. The structure allows only an outer surface and an outer peripheral side surface of the inner housing 50 composed of aluminum to be exposed, making it easy to match the color of the exposed surfaces of the inner housing 50 to that of the body of the vehicle, and it possible to improve the design of the vehicle. In this structure, the second flange portion 14f may be pressed to be fitted in the second annular groove 51g2 of the inner housing 50, or the second flange portion 14f may be fitted in the second annular groove 51g2 to be adhered on the first and second stepped portions 51f2 and 51f3 of the inner housing 50. Moreover, the second flange portion 14f may be screwed to the second stepped portion 51f2 of the inner housing 50.

Furthermore, in the ultrasonic transceiver 10b according to the second embodiment, inserting the annular oscillation absorption member 55 between the front surface of the bumper 21 and each of the inner end surfaces of the second flange portion 14f and the second stepped portion 51f3 of the first flange portion 51 and/or inserting the oscillation absorption layer in the first stepped groove 51f2 allows the prevention of the unnecessary oscillation of the first tubular side wall 50b to be more improved.

(Third Embodiment)

Figure 8:
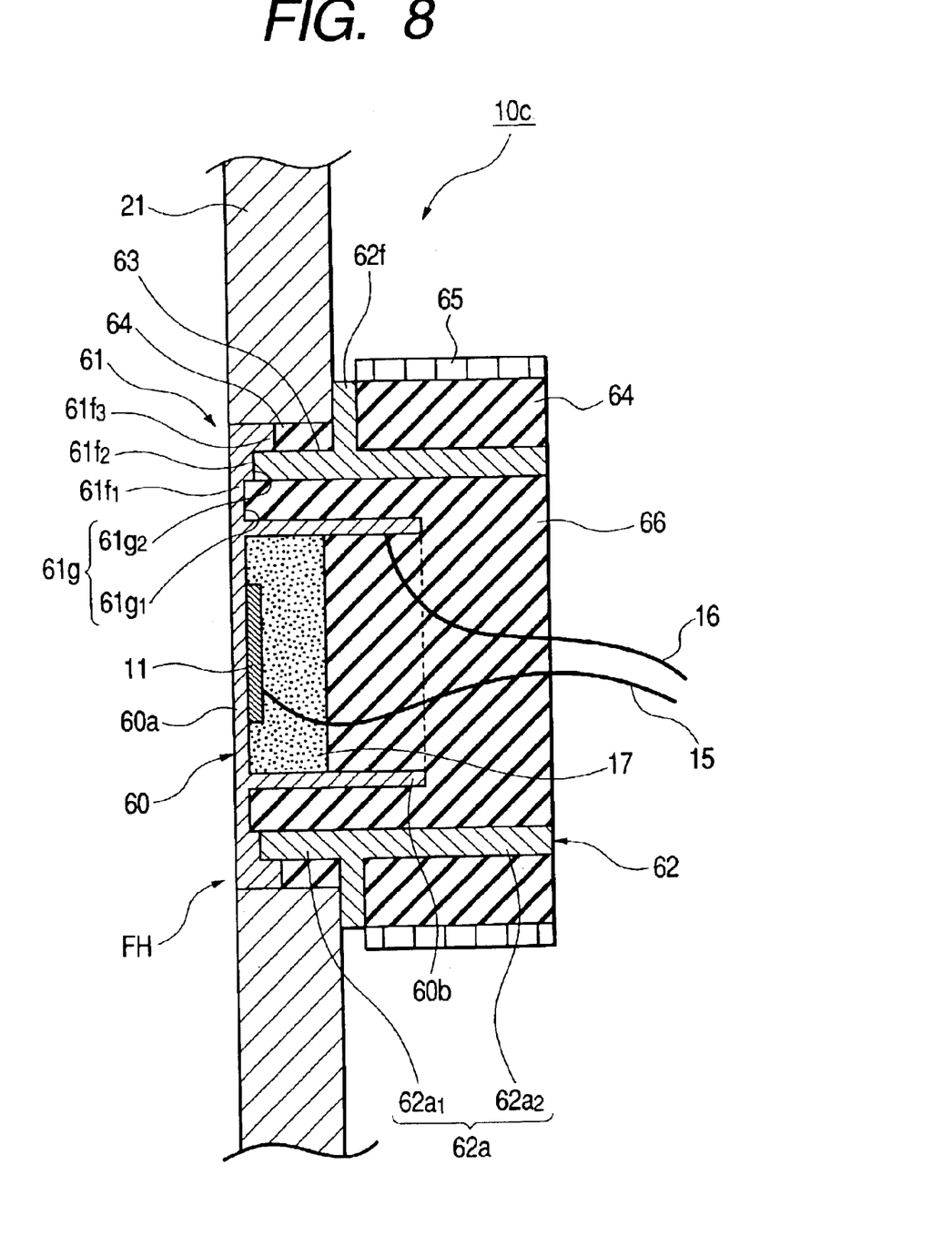
FIG. 8 is a longitudinal cross sectional view showing a state that an ultrasonic transceiver according to a third embodiment of the present invention is installed on a vehicle.

FIG. 8 is a longitudinal cross sectional view showing a state that an ultrasonic transceiver 10c according to a third embodiment is installed on a vehicle.

In FIG. 8, elements of the ultrasonic transceiver 10c which are the same as those of the ultrasonic transceiver 10a and/or the ultrasonic transceiver 10b are assigned to the same reference numerals thereof, omitting explanations of the elements of the ultrasonic transceiver 10c.

The ultrasonic transceiver 10c according to the third embodiment comprises an inner housing 60 which is provided with a cylindrical plate-like bottom portion (transmitting wall) 60a on its inner end surface of which the piezoelectric member 11 is mounted. The inner housing 60 is also provided with a first cylindrical tubular side wall 60b extending from the inner end surface of the peripheral portion of the transmitting wall 60a in the axial direction.

The ultrasonic transceiver 10c is configured in that, when the ultrasonic transceiver 10c is fitted to be secured in a fitting hole FH, only the inner housing 60 of the ultrasonic transceiver 10c is exposed from the front-side of bumper 21, and the outer end surface of the transmitting wall 60a and the front surface of the bumper 21 are substantially located in one plane.

The inner housing 60 is provided with a first flange portion 61 formed with an annular double-stepped portion. That is the first flange portion 61 is formed with an annular portion 61f1 extending from the peripheral portion of the transmitting wall 60a in the radial direction and projecting outwardly from the tubular side wall 60b. The first flange portion 61 is also formed with a first stepped portion 61f2 projecting from a middle portion of the annular portion 61f1 in its axial direction at a predetermined first length, and a second stepped portion 61f3 projecting from an outer peripheral portion of the annular portion 61f1 in its axial direction at a predetermined second length.

The first stepped portion 61f2 and the second stepped portion 61f3 are integrated so that the second projecting length is larger than the first projecting length, providing an annular double stepped groove 61g which is composed of a first annular groove 61g1 formed among the annular portion 61f1, the first stepped portion 61f2 and the first tubular side wall 60b, and a second annular portion 61g2 formed among the first stepped portion 61f2, the second stepped portion 61f3 and the second side wall 60b.

The ultrasonic transceiver 10c is provided with an outer housing 62. The outer housing 62 has a second cylindrical tubular side wall 62a one annular end portion of which is fitted in the second annular groove 61g2.

The outer housing 62 also has a second flange portion 62f coaxially extending in its radial direction from a predetermined position of the second tubular side wall 62a and a radial length of the second flange portion 62f is longer than that of the second stepped portion 61f3.

A length of the predetermined position of the first tubular side wall 62a from the outer end surface of the transmitting wall 60a is equal to an axial thickness of the bumper 21 so that a first portion 62a1 of the second tubular side wall 62a which corresponds to the length of the first tubular side wall 62a is fitted in the second annular groove 61g2 while an outer end surface of the second flange portion 62f opposite to an inner surface (buck surface) of the bumper 21 is contacted to the buck surface thereof.

The ultrasonic transceiver 10c is formed with a third annular groove 63 among the first portion 62a1 of the second tubular side wall 62a, the second stepped portion 61f3 and the second flange portion 62f. The ultrasonic transceiver 10c has a first annular oscillation absorption member 64 composed of, for example, rubber or other similar material.

The first annular oscillation absorption member 64 is fitted in the third annular groove 63 so as to be wound around the outer periphery of the first portion 62a1 of the second tubular side wall 62a so as to be fitted in the third annular groove 63.

The ultrasonic transceiver 10c has a second annular oscillation absorption member 64 with a predetermined radial thickness which is composed of, for example, rubber or other similar material. The second annular oscillation absorption member 64 is wound around the outer periphery of a second portion 62a2 of the second tubular side wall 62a, second portion 62a2 which is positioned inwardly from the second flange portion 62f of the second tubular side wall 62a.

The second oscillation absorption member 64 is contacted to an inner end surface (back surface) of the flange portion 62f. The ultrasonic transceiver 10c has an annular film member 65 wound around the outer periphery of the second annular oscillation absorption member 64 for protecting it from an outside environment thereof.

In addition, the ultrasonic transceiver 10c is provided with an oscillation absorption member 66 composed of, for example, rubber or other similar material. The oscillation absorption member 66 is fitted in the tubular cavity of the first tubular side wall 60b and mounted on the sponge 17. The oscillation absorption member 66 is also fitted in the tubular cavity of the first tubular side wall 62a and in the first annular groove 61g1, respectively.

When installing the ultrasonic transceiver 10c in the bumper 21 of the vehicle, at first, a fitting hole FH an outer diameter of which allows the flange portion 61 of the ultrasonic transceiver 10c to be inserted is provided in the bumper 21 to be penetrated therethrough. The flange portion 61 of the ultrasonic transceiver 10c is inserted in the fitting hole FH to be secured thereto with an elastic member or the like so that the outer end surface of the second flange portion 62f is contacted to the buck surface of the bumper 21, allowing the outer end surface of the transmitting wall 60a and the front surface of the bumper 21 to be located flat in one plane.

The outer end surface of the transmitting wall 60a and the front surface of the bumper 21 are coated with same coating material, allowing the ultrasonic transceiver 10c to be installed with its good appearance being kept.

In addition, the first and second annular oscillation absorption members 63 and 64 can prevent the unnecessary transmission and reverberation of ultrasonic waves.

In the third embodiment of the ultrasonic transceiver 10c according to the third embodiment, the second annular groove 61g2 is formed in the flange portion 61 of the inner housing 60 so that the one end portion of the tubular side wall 62a of the outer housing 62 is fitted in the second annular groove 61g2, but the present invention is not limited to the structure.

That is, the outer housing 62 and the inner housing 60 may be integratedly formed so that the second flange portion 62f of the outer housing 62 is secured to an object of the vehicle to which the ultrasonic transceiver 10c is installed, such as the bumper 21 or other similar parts of the vehicle, making it simplify the structure of the ultrasonic transceiver.

As described above, in the third embodiment of the present invention, the oscillation absorption members are covered to be concealed with respect to an outside environment of the ultrasonic transceiver, making it possible to prevent any foreign particles, such as wax particles from being adhered on the oscillation absorption members, respectively, allowing an accurate judgment whether or not a trouble and/or a normality occurs in the ultrasonic transceiver 10c on the basis of the reverberation waveform.

In addition, the outer surface of the ultrasonic transceiver and one surface of an object for which the ultrasonic transceiver is provided are located flat in one plane, allowing the good appearance of the provided portion to be kept.

Figure 9A:
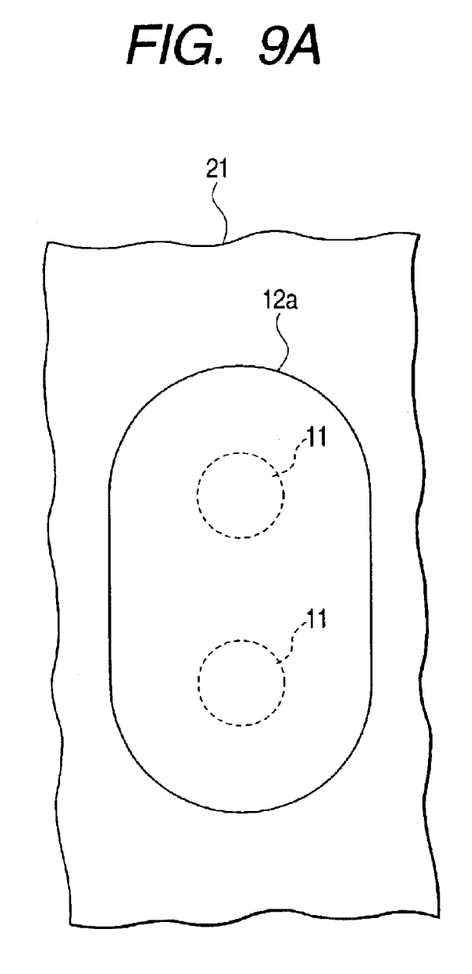
FIG. 9A is a front view showing a front surface of a bumper to which a modification of the ultrasonic transceiver according to the third embodiment is installed.
Figure 9B:
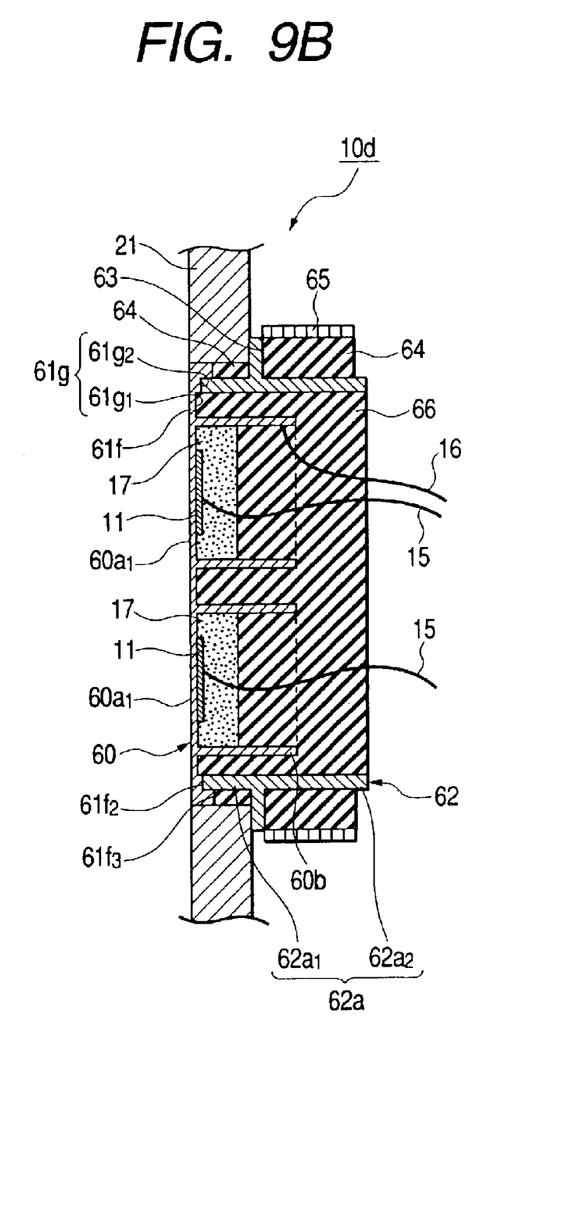
FIG. 9B is a longitudinal cross sectional view showing a state that the ultrasonic transceiver shown in FIG. 9A is installed to the bumper.

FIG. 9A is a front view showing a front surface of a bumper to which a modification of the ultrasonic transceiver according to the third embodiment is installed, and FIG. 9B is a longitudinal cross sectional view showing a state that the ultrasonic transceiver is installed to the bumper.

In each of FIGS. 9A and 9B, elements of the modified ultrasonic transceiver 10d which are the same as those of the ultrasonic transceiver 10c are assigned to the same reference numerals thereof, omitting explanations of the elements of the ultrasonic transceiver 10d.

The ultrasonic transceiver 10d has a plurality of inner housings 60, such as two inner housings 60 in this modification as an example, arranged in the longitudinal direction of the bumper 21, and the transmitting walls 60a of the two inner housings 60 are integrated so as to form, in view of the front side thereof, a substantially elliptic shape as a whole. The ultrasonic transceiver 10d has two piezoelectric members 11 mounted on the inner end surfaces of the transmitting walls 60a, respectively.

The ultrasonic transceiver 10d is provided with two sponges 17 for absorbing ultrasonic waves. The sponges 17 are inserted in the tubular cavities of the inner housings 60 and mounted on the inner end surfaces of the transmitting walls 60a, respectively.

The ultrasonic transceiver 10d has the oscillation absorption member 66 fitted in the tubular cavities of the first tubular side walls 60b and mounted on the sponges 17. The oscillation absorption member 66 is also fitted in the tubular cavities of the second tubular side walls 62a and in the first annular grooves 61g1, respectively.

The structure of the ultrasonic transceiver 10d allows the detection area thereof to be enlarged, making it possible to improve the detection accuracy of the ultrasonic transceiver 10d, in addition to the effects obtained by the third embodiment.

Similarly, an ultrasonic transceiver may have a plurality of inner housings 12 according to the first embodiment, and an ultrasonic transceiver may have a plurality of inner housings 50 according to the second embodiment.

Incidentally, in the first, second and third embodiments, and modifications, each of the tubular side walls has a substantially cylindrical tubular shape, that is, has a substantially circular shape in its lateral cross section, but the present invention is not limited to the structure. That is, each of the tubular side walls may have another shape in its lateral cross section including, for example, a substantially rectangular shape.

Similarly, each of the annular oscillation absorption members has a substantially circular shape in its lateral cross section, but each of the annular oscillation absorption members may have another shape in its lateral cross section, such as a substantially rectangular shape.

Moreover, in the first, second and third embodiments, and modifications, the ultrasonic transceiver is installed to the bumper of the vehicle, but the present invention is not limited to the structure.

That is, the ultrasonic transceiver may be installed to portions of objects, such as plate members or the like.

In addition, the inner housing may be pressed to be integratedly fit in the outer housing, or the inner housing may be adhered on the outer housing to be integrated therewith, or the inner housing may be screwed to the outer housing to be integrated therewith.

Furthermore, the inner housing may be integrated with the outer housing by cutting process, wringing process, casting process or other similar processes.

In addition, an ultrasonic clearance sonar may use at least one of the ultrasonic transceivers according to the first, second and third embodiment, and modifications.

While there has been described what is at present considered to be the preferred embodiments and modifications of the present invention, it will be understood that various modifications which are not described yet may be made therein, and it is intended to cover in the appended claims all such modifications as fall within the true spirit and scope of the invention.

The entire contents of Japanese Patent Application 2001-396162 filed on Dec. 27, 2001 and those of Japanese Patent Application 2002-311860 filed on Oct. 25, 2002 are incorporated herein.

What is claimed is:

1. An ultrasonic transceiver comprising:

a piezoelectric member;

an inner housing having a bottom portion, a first tubular side wall extending from one end surface of the bottom portion and a first flange portion formed on an outer peripheral portion of the first tubular side wall, said bottom portion and first tubular side wall providing a tubular cavity therebetween, said piezoelectric member being mounted on the one end surface of the bottom portion in the tubular cavity;

an outer housing having a second tubular side wall coaxially arranged around the outer peripheral portion of the first tubular side wall with a predetermined gap therebetween, said second tubular side wall being provided with one end portion which is opposite to one end surface of the first flange portion and contacted thereto; and a first absorption member inserted in the gap between the first tubular side wall and the second tubular side wall.

2. An ultrasonic transceiver according to claim 1, wherein said outer housing is formed at the one end portion of the second tubular side wall with a second flange portion, said second flange portion being closely adhered on the one end surface of the first flange portion, allowing the oscillation absorption member to be concealed from the outside thereof.

3. An ultrasonic transceiver according to claim 1, wherein said first absorption member has a tubular side portion with a predetermined width, said tubular side portion being fixedly contacted to the first flange portion and covering the outer peripheral portion of the first tubular side wall.

4. An ultrasonic transceiver according to claim 1, wherein said first flange portion is formed with an annular groove portion formed around the outer peripheral portion of the first tubular side wall.

5. An ultrasonic transceiver according to claim 4, wherein said annular groove portion comprises a first annular groove, further comprising a second oscillation absorption member fitted in the first annular groove.

6. An ultrasonic transceiver according to claim 5, wherein said second oscillation absorption member is integratedly formed with the first oscillation absorption member.

7. An ultrasonic transceiver according to claim 4, wherein said annular groove portion comprises a second annular groove in which the second flange portion of the outer housing is fitted.

8. An ultrasonic transceiver according to claim 1, wherein said ultrasonic transceiver is installed to a fitting surface of an object so that the second flange portion is opposite to the fitting surface thereof, further comprising a third oscillation absorption member fitted between the second flange portion and the fitting surface.

9. An ultrasonic transceiver according to claim 1, wherein said inner housing includes a plurality of inner housing elements each of which has the bottom portion, the first tubular side wall and the first flange portion, and said piezoelectric member includes a plurality of piezoelectric elements, said piezoelectric elements being mounted on the one surface of the bottom portions of the inner housing elements, respectively.

10. An ultrasonic transceiver according to claim 1, wherein said inner housing and outer housing are integratedly formed.

11. An ultrasonic transceiver comprising:

a piezoelectric member;

an inner housing having a bottom portion, a first tubular side wall extending from one end surface of the bottom portion and a first flange portion formed on an outer peripheral portion of the first tubular side wall, said bottom portion and first tubular side wall providing a tubular cavity therebetween, said piezoelectric member being mounted on the one end surface of the bottom portion in the tubular cavity;

an outer housing having a second tubular side wall and a second flange portion coaxially extending in its radial direction from a predetermined position of an outer peripheral portion of the second tubular side wall, said second tubular side wall being coaxially arranged around the outer peripheral portion of the first tubular side wall with a predetermined gap therebetween and being provided with one end portion which is opposite to one end surface of the first flange portion and contacted thereto, said predetermined position being away from other end surface of the transmitting wall in the axial direction by a predetermined length; and a first absorption member inserted in the gap between the first tubular side wall and the second tubular side wall.

12. An ultrasonic transceiver according to claim 11, wherein said ultrasonic transceiver is installed in a fitting hole provided in a plate member, and wherein said predetermined length is determined so that, when the first flange portion of the ultrasonic transceiver is installed in the fitting hole and the second flange portion is opposite to one surface of the plate member to be contacted thereto, said other surface of the bottom wall and other surface of the plate member is located flat in one plane.

13. An ultrasonic transceiver according to claim 11, further comprising an annular groove formed among the first flange portion, the second flange portion and the outer peripheral portion of the second tubular side wall; and a second absorption member fitted in the annular groove to be wound around the outer peripheral portion of the second tubular side wall.

14. An ultrasonic transceiver according to claim 11, wherein said inner housing includes a plurality of inner housing elements each of which has the bottom portion, the first tubular side wall and the first flange portion, and said piezoelectric member includes a plurality of piezoelectric elements, said piezoelectric elements being mounted on the one surface of the bottom portions of the inner housing elements, respectively.

15. An ultrasonic transceiver according to claim 11, wherein said inner housing and outer housing are integratedly formed.

* * * * *